Jan. 12, 1960
J. P. TERRETT
2,920,643
BACK PRESSURE REGULATING VALVE
Filed May 29, 1956
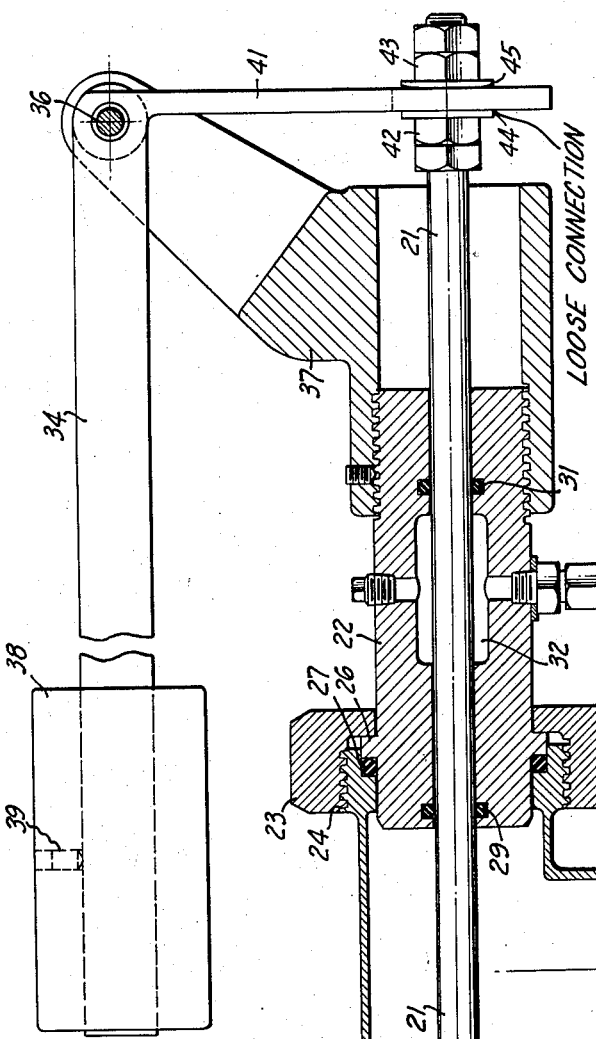
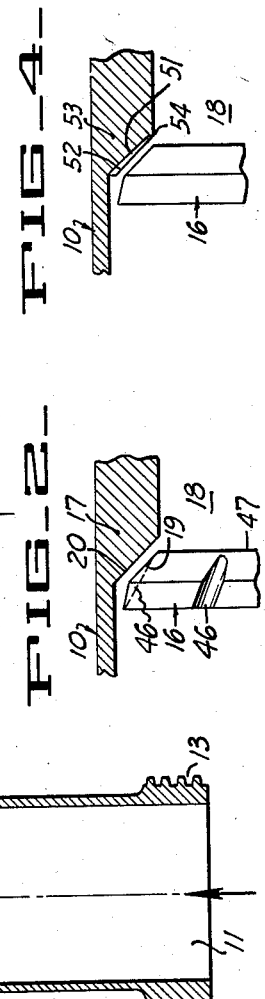
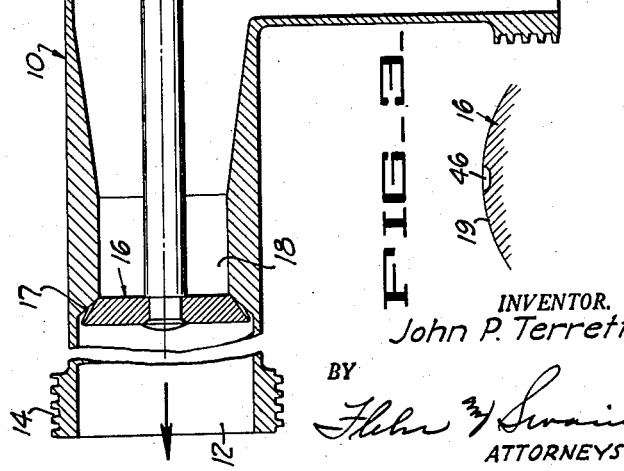
INVENTOR.
John P. Terrett
BY
ATTORNEYS

United States Patent Office 2,920,643
Patented Jan. 12, 1960

2,920,643

BACK PRESSURE REGULATING VALVE

John P. Terrett, San Francisco, Calif., assignor to Foremost Dairies, Inc., San Francisco, Calif., a corporation of New York Application May 29, 1956, Serial No. 588,039

4 Claims. (Cl. 137—332)

This invention relates generally to back pressure control valves suitable for use in systems invloving controlled flow of a liquid material from a processing operation where it is heated while being maintained at a pressure above atmospheric, to a region of lower pressure.

One type of processing which has been used in the food industry for the treatment of materials like milk and milk products, involves continuously supplying the fluid material to a sterilizing unit where it is rapidly heated to an elevated sterilizing temperature of the order of 260° to 300° F., held for a short predetermined period at a pressure sufficient to prevent vaporization, and then cooled to a temperature below that tending to cause undesirable cooking effects.

A typical processing system such as has been used in the dairy industry employs a feed tank which serves to furnish a constant supply of fluid material to a high pressure feed pump which continuously forces the material through the entire system. A preheater raises the temperature of the material to about 170° to 200° F. From the preheater the material passes through a sterilizer unit of the tubular heat exchange type which raises the temperature of the material to within the range of 265° to 300° F. Thereafter the material flows through a holding tube designed to provide the required holding time to complete sterilization. The holding time ranges inversely with the temperature employed, as for example from two minutes at the lower temperature to from one to two seconds at the higher temperature. From the holding tube the material is discharged to a tubular cooler to rapidly reduce the temperature of the material to from 50° to 80° F. Thereafter the material may be aseptically canned in previously sterilized containers.

A more desirable form of sterilizing unit is one making use of direct fluid (e.g. steam) injection heating. Direct fluid injection heating provides rapid heat transfer, thus facilitating high temperature short-time sterilization without localized overheating. Also it is desirable to use evaporative cooling in place of a tubular cooler, because it makes possible an instantaneous reduction in temperature from the high critical temperature of the sterilizing unit to a temperature below that tending to cause undesirable cooking effects.

When it is attempted to employ direct injection heating together with evaporative cooling, difficulties are experienced in properly controlling the system for optimum results.

In general the successful operation of such a system is dependent upon maintenance of a predetermined pressure differential between the holding tube, which at normal operating temperatures is under minimum pressures ranging from about 38 to 67 p.s.i. absolute, and the vacuum chamber which in typical instances may be operated under pressures ranging from about 0.2 p.s.i. absolute to atmospheric pressure (14.7 p.s.i. absolute), or slightly higher depending upon the design of the equipment and the conditions required of the material being treated. Conventional pressure control valves have been found unsatisfactory for this purpose. Particularly they are not capable of coping with pressure fluctuations which tend to occur in sterilizing units of the direct fluid injection type. With the use of valves of conventional construction, the temperature responsive control means for the sterilizing unit tends to become erratic to the extent of making the complete system unstable and impractical. Such means generally consists of a pneumatic diaphragm operated valve that regulates the steam flow, in which air pressure is controlled by a thermostatic element in heat exchange relationship with the material being heated. Inherent correction lags in such equipment cause recurrent pressure changes in the treatment zone of the sterilizer and holding tube. When a conventional back pressure regulating valve is used for controlling the flow of material from the holding tube to the vacuum chamber, the labile conditions causing such pressure changes are exaggerated to the point of making the equipment erratic and inoperative.

In general it is an object of the present invention to provide a back pressure regulating valve for use in systems of the above character, and which will make possible the use of direct injection with direct discharge of the material from the sterilizing unit into an evacuated chamber for rapid cooling.

Another object of the invention is to provide a back pressure regulating valve capable of coping with pressure fluctuations occurring in a direct fluid injection heating system of the type described above without causing erratic operation.

Another object of the invention is to provide a novel sanitary back pressure regulating valve for use in the processing of various products.

Additional objects and features of the invention will appear from the following description in which the preferred embodiment of the invention has been set forth in detail in conjunction with the accompanying drawing.

Referring to the drawing:

Figure 1 is a side elevational view, partly in section, illustrating a back pressure regulating valve made in accordance with the present invention.

Figure 2 is an enlarged detail illustrating the construction of the valve seat and associated valve member.

Figure 3 is a detail in section showing one of the ducts formed in a valve working surface.

Figure 4 is an enlarged detail like Figure 2 but showing another embodiment.

The valve illustrated in Figure 1 consists of a body 10 provided with the inflow and outflow passages 11 and 12. Portions 13 and 14 are threaded or otherwise formed to facilitate making connections with associated equipment. A movable valve member 16 within the body cooperates with the annular seat 17. The opening 18 through the seat forms a throat orifice connecting the inflow and outflow passages for open position of the valve. Cooperating conical shaped valve working surfaces 19 and 20 are formed on the valve member and seat respectively, whereby when the valve is closed these valve working surfaces engage upon a conical area of interface contact.

The valve member 16 is attached to the valve operating stem 21, which extends to the exterior of the valve through the bonnet 22. The bonnet is removably secured to the body by suitable means such as the nut 23 which has the threaded connection 24 with the body, and which engages a flange or shoulder 26 on the bonnet. Sealing means such as the resilient O-ring 27, prevents leakage between the bonnet and the body. Spaced sealing means 29 and 31, preferably of the O-ring type, are provided between the bonnet and the stem 21. The space 32 between seals 29 and 31 can be connected to a steam supply pipe 33, to maintain a seal which insures sterile conditions within the valve body.

Suitable loading means, preferably of the weight type, is provided for yieldably urging the valve member toward closed position against the inflow pressure. Thus an arm 34 is provided with a fulcrum connection 36 to the support bracket 37, and serves to carry the weight 38. By loosening the set screw 39, the weight can be adjusted to a desired position along the arm. The arm 41 that is attached to lever 34 operatively connects with the exterior end of the stem 21. This connection may include stop nuts 42 and 43 and washers 44 and 45, and permits sufficient angular movement between the stem and the arm 41 to accommodate movements of the valve member between its operating positions. Washers 44 and 45 may be parts of a journal assembly that permits axial rotation of the stem.

Referring to Figure 2, in accordance with the present invention the valve working surface 19 of the valve member is relieved by providing the grooves or ducts 46 at regular circumferentially spaced points about the valve member. One end of each groove or duct terminates adjacent to but short of the leading edge 47 of the associated valve working surface, thus leaving a portion of the valve working surface capable of engaging surface 20 of the valve seat, to effect complete shut off when the valve is in closed position. The other end of each duct is at all times in free communication with the outflow passage 12.

By means of the grooves or ducts 46, at least one of the valve working surfaces is relieved to a substantial extent and thus the grooves accommodate a substantial amount of flow when the valve working surfaces are in close proximity but out of direct contact.

Operation of my valve can best be explained by assuming that it is used in a sterilization system making use of direct fluid injection and evaporative cooling as previously described. Thus the inflow passage 11 is connected to the holding tube of a sterilizing system, the sterilizing unit of which is supplied with steam through a valve regulated in accordance with the temperature in the sterilizing zone. As previously mentioned each regulating valve can be of the pneumatic diaphragm operated type, connected to a pneumatic operating system of the supply and waste type, which in turn is controlled in accordance with a thermostatic element responsive to the temperature in the sterilizing zone.

The outlet passage 12 is directly connected to a chamber or receiver that is evacuated to maintain a desired partial vacuum depending upon the temperature level to which one desires to cool the material. The weight 38 is adjusted in accordance with the pressure differential which one desires to maintain between the inflow and outflow passages. When the pressure differential between the inflow and outflow passages is below that for which the device is set, the valve member remains sealed with respect to the seat and no flow occurs from the holding tube to the vacuum chamber. When the pressure differential reaches a normal value for which the device is set to operate the fluid forces acting upon the valve member 16 move the same against the loading force until sufficient flow occurs through the ducts 46 and between the valve working surfaces to maintain the desired pressure differential.

Contrary to valves of conventional construction, there is no tendency for chattering to occur between the movable valve member and its associated seat, even though while in operation the valve member may be relatively close to contact with the seat. Furthermore there is no tendency toward sensitiveness due to variations in flow rate, whereas with valves of conventional construction variations in flow rate as well as variations in static pressure differential tend to apply fluid forces to the valve member, which in conjunction with pressure variations tending to occur in the sterilizing unit, cause erratic overall operation of the system. A further feature of the present valve is that relatively short increments of movement of the valve member suffice to maintain the desired pressure differential, as compared to the relatively large movements required of conventional valves.

The adjustable weight 38 on the arm 34 provides a convenient means to maintain proper operating conditions. In general the position of this weight should be adjusted whereby the desired pressure differential is maintained between the inflow and outflow passages 11 and 12, with continual flow of material and without occasioning direct contact between the valve member and its associated seat, during normal operation.

It will be evident that the specific construction employed, and the proportioning of the parts, may vary in different instances. For example the taper or angle of the valve working surfaces may vary from about 30° to 60°. The grooves or ducts may occupy from 20 to 70 percent of the valve seating area which otherwise would be present. These grooves or ducts are evenly distributed about the circumference of the valve working surfaces, and at least two such grooves should be used to provide a proper balance.

As shown in Figure 2 it is desirable to incline the grooves to an angle of the order of 30° to a plane coincident with the axis of stem 21, whereby during normal operation the flow of material through the grooves causes creation of a force component acting to rotate the valve member and stem. This makes for continued even seating of the valve and facilitates free movement of the valve stem in an axial direction.

As shown in Figure 4 the grooves may be formed in the seat instead of the valve member. Thus in this instance the grooves 51 interrupt the valve working surface 52 of the valve seat 53. Each groove at its one end terminates short of the leading seat edge 54 and at its other end freely communicates with the outflow passage.

By way of example, in one particular instance my valve is employed in a system designed for high temperature short-time sterilization of milk and milk products, at a continuous rate of 800 gallons per hour. This system comprises a high pressure feed pump operating at a head pressure of 55 p.s.i. gauge, a tubular preheater serving to preheat the product to a temperature of 180° F., a direct steam injection heater of the type previously described which heats the product to a temperature of 265° F., and a holding tube in which the product is held at 265° F., for two minutes to complete sterilization. The back pressure control valve is made as shown in Figure 1 and is connected between the holding tube and a vacuum chamber into which the sterilized product is delivered. The vacuum chamber operates at a vacuum of 20.3 inches of mercury (4.74 p.s.i. absolute pressure) to cool the product to a temperature of 160° F. preparatory to homogenization, after which it is cooled to approximately 80° F. in a tubular cooler prior to canning in previously sterilized containers. The movable valve member 16 has a diameter of one inch, with a 45° taper for the valve working surface. Approximately 30 percent of the valve seating surface is relieved by means of 8 grooves each approximately ⅛ inch wide and 1/16 inch deep. These grooves are equally distributed about the circumference of the disc. Also they are disposed at angles of approximately 30° with respect to the axis of the disc, in order to impart a rotary motion to the disc and stem during normal operation.

The back pressure valve in the foregoing example functions to maintain a desired pressure differential without chattering or erratic operation, and in general makes it possible for the entire system to function in a satisfactory manner, with optimum control over the critical high temperature sterilizing conditions.

In one additional example the system described above is modified by employing a homogenizer as the feed pump, and a vacuum chamber is operated at 0.36 p.s.i. absolute to permit the product to be cooled to approximately 70°

F. preparatory to canning. In this instance whole milk being treated is heated to a temperature of 285° F., and held in a holding tube for 10 seconds to effect sterilization before passing through the back pressure control valve into the vacuum chamber. The pressure differential maintained across the valve is approximately 69.34 p.s.i. absolute. This requires a corresponding change in the setting of weight 38.

Although I have described my back pressure control valve in systems for the treatment of fluid products or milk products it will be evident that the device can be used in connection with direct fluid injection heating units and evaporative cooling systems designed to process a variety of products over a wide range of temperature and pressure conditions. Specific reference can be made to such products such as pharmaceuticals, which require sterilization under carefully controlled time and temperature factors, as well as to a variety of food products.

I claim:

1. Pressure responsive apparatus for controlling flow of fluid material undergoing processing from a heating unit of the direct fluid injection type to the lower pressure of an evaporative cooling chamber, said apparatus comprising a body having inflow and outflow passages, an operating rod extending into the body, a movable valve member disposed within the body and carried by the inner end of said rod, a valve seat within the body formed to provide a throat orifice communicating between the inflow and outflow passages for open position of the valve, said valve member and said seat having substantially conical cooperating valve working surfaces adapted for closed valve position to contact on a conical interface seating area extending for a substantial distance in the direction of the axis of the throat, at least one of said valve working surfaces having the seating area of the same interrupted by a plurality of angularly disposed flow accommodating grooves, said grooves extending generally in the direction of flow from points closely adjacent to but spaced from the inflow edge of said interface seating area to the outflow side of the valve, said valve member being movable in opposite directions and closing against the pressure in the inflow passage, and means applying a predetermined constant loading force to the valve member to yieldably urge the same in a direction toward closed position, said loading means and valve member being movable to valve open position in response to a predetermined pressure differential.

2. Apparatus as in claim 1 in which said grooves are formed in the valve seat.

3. Apparatus as in claim 1 in which said grooves are formed in the valve member.

4. Apparatus as in claim 1 wherein said loading means including an adjustable counterweight having a pivotal connection with said operating rod.

References Cited in the file of this patent

UNITED STATES PATENTS

| | | |
|---|---|---|
| 678,271 | Mueller | July 9, 1901 |
| 909,479 | Thwing | Jan. 12, 1909 |
| 1,473,068 | Whittam | Nov. 6, 1923 |
| 1,684,220 | Gibson | Sept. 11, 1928 |
| 2,635,903 | Hansen | Apr. 21, 1953 |
| 2,649,273 | Honegger | Aug. 18, 1953 |
| 2,755,816 | Collins | July 24, 1956 |

FOREIGN PATENTS

| | | |
|---|---|---|
| 403,206 | Great Britain | Dec. 21, 1933 |
| 52,435 | Denmark | Dec. 14, 1936 |